United States Patent
Yoshida et al.

(10) Patent No.: US 7,818,138 B2
(45) Date of Patent: Oct. 19, 2010

(54) POSITION DETECTING DEVICE AND POSITION DETECTING METHOD

(75) Inventors: Takashi Yoshida, Tokyo (JP); Masaru Suzuki, Tokyo (JP); Katsumi Kakuta, Tokyo (JP)

(73) Assignee: Asahi Kasei EMD Corporation, Tokyo (JP)

( * ) Notice: Subject to any disclaimer, the term of this patent is extended or adjusted under 35 U.S.C. 154(b) by 165 days.

(21) Appl. No.: 12/298,445

(22) PCT Filed: Apr. 26, 2007

(86) PCT No.: PCT/JP2007/059114

§ 371 (c)(1),
(2), (4) Date: Oct. 24, 2008

(87) PCT Pub. No.: WO2007/126023

PCT Pub. Date: Nov. 8, 2007

(65) Prior Publication Data

US 2009/0177436 A1    Jul. 9, 2009

(30) Foreign Application Priority Data

Apr. 27, 2006    (JP) .............................. 2006-124224

(51) Int. Cl.
*G01C 19/00*    (2006.01)
*G01B 7/00*    (2006.01)

(52) U.S. Cl. .................................. 702/150; 324/207.17

(58) Field of Classification Search ................. 702/150, 702/94, 95; 324/207.17, 207.26; 318/560, 318/561
See application file for complete search history.

(56) References Cited

U.S. PATENT DOCUMENTS 5,932,984 A  *  8/1999  Murakami et al. ........... 318/560
2005/0073293 A1 *  4/2005  Hastings et al. .......... 324/117 H

FOREIGN PATENT DOCUMENTS

JP    01-150812    6/1989
(Continued)

OTHER PUBLICATIONS

International Preliminary Report on Patentability dated Jan. 22, 2009, four (4) pages.

*Primary Examiner*—Bryan Bui
(74) *Attorney, Agent, or Firm*—Morgan Lewis & Bockius LLP

(57) ABSTRACT

The present invention relates to a position detecting device capable of canceling an error due to looseness in a vertical direction and of eliminating variation in temperature characteristics by calculating a ratio between output voltages of a plurality of Hall elements. Assuming that the Hall voltage Vhe1 of a Hall element becomes A·K·Bhe1 (A is the amplification factor of a preamplifier, K is a constant, and Bhe1 is the magnetic flux density the Hall element receives), then a PI regulator automatically adjusts the bias point of the PI output by feedback control in such a manner that A·K·Bhe1+Vref=AGND (=0) holds. The Hall voltage Vhe2 of the Hall element after amplification becomes A·K·Bhe2. Since K=−Vref/A·Bhe1, the Hall voltage Vhe2 of the Hall element is given by −Vref·Bhe2/Bhe1.

15 Claims, 8 Drawing Sheets

FOREIGN PATENT DOCUMENTS

| | | |
|---|---|---|
| JP | 2001-091208 | 4/2001 |
| JP | 2002-054903 | 2/2002 |
| JP | 2003-344187 | 12/2003 |
| JP | 2004-132751 | 4/2004 |
| JP | 2005-284169 | 10/2005 |
| JP | 2005-331399 | 12/2005 |
| JP | 2006-047054 | 2/2006 |
| JP | 2006-058818 | 3/2006 |

* cited by examiner

DIFFERENCE   OUTPUT AT ORIGIN = 0

DIVISION   OUTPUT AT ORIGIN = 1 (RATIO)
          WHICH IS NONZERO

POSITION DETECTING DEVICE AND POSITION DETECTING METHOD

TECHNICAL FIELD

The present invention relates to a position detecting device and a position detecting method, and more particularly to a position detecting device and a position detecting method for detecting the origin of an autofocus or zoom position of a camera.

BACKGROUND ART

Conventionally, as a position detecting sensor, a sensor using a photo interrupter (transmission photo sensor) or a photo reflector (reflection photo sensor) is known.

The photo interrupter is a sensor that has a structure where a light-emitting element for converting an electric signal to an optical signal and a light-receiving element for converting an optical signal to an electric signal are faced to each other with fixed spacing and are integrated into a single housing, and that detects the presence or absence of an object according to changes in quantity of light caused by light passing through the two elements.

On the other hand, the photo reflector is a sensor that has a structure where a light-emitting element for converting an electric signal to an optical signal and a light-receiving element for converting an optical signal to an electric signal are placed on the same side and are integrated into a single housing, and that detects changes in reflected light from an object.

For example, a device described in Patent Document 1 uses a photo interrupter as a position detecting sensor, and has a sensor for detecting the original position of a zoom lens unit or focus lens unit driven in the direction of the optical axis, the sensor being mounted on a lens barrel having a zoom function or focusing function of the digital still camera. The detection of the original position is carried out by using a screening component and a photo interrupter mounted on the lens unit, by driving the lens unit with a motor, by screening light with the screening component when it is moved together with the lens unit and crosses a photosensor, and by monitoring the output level of the photosensor.

Furthermore, a device described in Patent Document 2, for example, employs a photo reflector as a position detecting sensor, has the photo reflector fixed to one of the two relatively rotating components, a fixed collar, for example, and has a reflective component (reflective sheet) fixed with an adhesive to the other component, a rotating collar, for example. Both the photo reflector and reflective component are fixed to predetermined positions so that the origin detection is made at the position where the output of the photo reflector is produced.

Although such devices that employ the photo interrupter or photo reflector as the position detecting sensor are stable in temperature characteristics, they have a problem of increasing size, thereby hindering miniaturization of an AF (autofocus) unit. To solve the problem, a position detecting sensor using a magnet and a magnetic sensor has been developed (see Patent Document 3, for example).

FIG. 1 and FIG. 2 are block diagrams for explaining a conventional position detecting device based on a magnetic sensor: FIG. 1 is a diagram showing a position detecting sensor comprising a magnet and Hall elements; and FIG. 2 is a diagram showing a signal processing circuit of the position detecting device incorporating the position detecting sensor shown in FIG. 1.

As shown in FIG. 1, the position detecting sensor has one magnet (magnetic flux generating body) 1 and two Hall elements (such as a pair of Hall elements (a magnetic sensor pair)) 2a and 2b placed separately from each other. The magnet 1 has a cylindrical shape, whose top side and bottom side are magnetized to the N-pole and the S-pole, respectively. The pair of the Hall elements 2a and 2b are fixed to a fixing side body (fixing component) such as a device body, and the magnet 1 is fixed to a moving side body (moving component) that moves with respect to the fixing component. Then, the magnet 1 fixed to the moving component can move in the direction of the arrow AR1 (X direction) with respect to the Hall element pair 2a and 2b fixed to the fixing component. Here, symbols BD each designate a magnetic flux detection axis.

The signal processing circuit 3 shown in FIG. 2 has differential amplifying sections 11a and 11b, a subtracting section 13 and a low-pass filter 15. The differential amplifying section 11a obtains Hall e.m.f. Vha, the difference between output potentials Va1 and Va2 of the Hall element 2a; and the differential amplifying section 11b obtains Hall e.m.f. Vhb, the difference between output potentials Vb1 and Vb2 of the Hall element 2b. Then, the subtracting section 13 calculates the difference $\Delta V$ ($=Vha-Vhb$) between Vha and Vhb. The output value from the subtracting section 13 passes through the low-pass filter 15, and is output as an output (position output) indicating the position of the magnet 1.

The signal processing circuit 3 further comprises an adding section 14, an arithmetic section 16, and a power control section 17; and these processing sections 14, 16 and 17 control the input voltage Vin to each of the Hall elements 2a and 2b in such a manner that the addition value (sum) of the output voltages (Hall e.m.f.) Vha and Vhb becomes constant. Thus, the signal processing circuit 3 is configured in order that while it controls the input value Vin to the Hall element pair 2a and 2b in such a manner that the addition value (Vha+Vhb) of the output values of the Hall element pair 2a and 2b becomes a constant value Vet, it detects the difference value $\Delta V$ between the output values of the Hall element pair 2a and 2b, and outputs as the position output.

However, the foregoing position detecting device incorporating the position detecting sensor including the magnet and the Hall elements has looseness in the moving mechanism (looseness in the vertical direction of the magnet) in general, which presents a problem of causing an error. In contrast with this, the photo interrupter detects the position in the horizontal direction without detecting the looseness in the vertical direction.

The present invention is implemented to solve the foregoing problems. Therefore it is an object of the present invention to provide a position detecting device and a position detecting method that enable cancellation of variation in the temperature characteristics and elimination of an error due to the looseness in the vertical direction by calculating a ratio between the output voltages of a plurality of Hall elements, and that enable miniaturization.

Patent Document 1: Japanese Patent Laid-Open No. 2006-58818;
Patent Document 2: Japanese Patent Laid-Open No. 2004-132751; and
Patent Document 3: Japanese Patent Laid-Open No. 2005-331399.

DISCLOSURE OF THE INVENTION

The present invention is implemented to achieve the object, and comprises: a plurality of magnetic detecting elements placed separately from each other; a magnetic flux generating body that moves relatively to the magnetic detecting elements; and deciding means for making a decision of an original position by using changes in a ratio between output voltages of the magnetic detecting elements, wherein the deciding means comprises a control section for feedback controlling the output voltage from a first magnetic detecting element of the magnetic detecting elements at a constant value; and a driving section for driving a second magnetic detecting element of the magnetic detecting elements by a same driving current as a driving current supplied to the first magnetic detecting element when the control section controls the output voltage at the constant value, and the deciding means obtains as its output a ratio between the output voltage of the first magnetic detecting element and the output voltage of the second magnetic detecting element.

Besides, the position detecting device can operate in a condition that an absolute value of magnetic flux density the first magnetic detecting element and the second magnetic detecting element each detect is a certain value excluding zero.

Furthermore, the control section can comprise a function of adding a reference voltage to the output voltage of the first magnetic detecting element; and a function of adjusting the output voltage of the first magnetic detecting element at the constant value.

Moreover, the position detecting device can comprise a feedback sample and hold circuit placed at a stage previous to the control section, for sampling the output signal of the first magnetic detecting element; and a sample and hold circuit placed at an output stage, for sampling the output signal of the second magnetic detecting element.

The position detecting device can place the magnetic flux generating body and the magnetic detecting elements in a manner that the outputs of the magnetic detecting elements become nonzero when the magnetic flux generating body is loaded, but become zero when the magnetic flux generating body is removed; and can make a decision of a loaded or unloaded state of the magnetic flux generating body according to an output of the ratio between the output voltages of the magnetic detecting elements.

Besides, the magnetic detecting elements can be Hall elements.

Furthermore, a position detecting method is provided in a position detecting device having a plurality of magnetic detecting elements placed separately from each other, and a magnetic flux generating body that moves relatively to the magnetic detecting elements, the position detecting method comprising: a step of obtaining an output voltage ($Vhe1=A \cdot K \cdot Bhe1$: A is the amplification factor of the amplifier, K is a constant, and Bhe1 is the magnetic flux density the first magnetic detecting element receives) of a first magnetic detecting element of the magnetic detecting elements; a step of performing feedback control in a manner that a sum of a reference voltage (Vref) and the output voltage (Vhe1) of the first magnetic detecting element becomes a constant value; a step of driving a second magnetic detecting element of the magnetic detecting elements by a same driving current as a driving current supplied to the first magnetic detecting element at a time when the feedback control is performed; and a step of obtaining an output voltage ($Vhe2=A \cdot K \cdot Bhe2$: Bhe2 is the magnetic flux density the second magnetic detecting element receives) of the second magnetic detecting element, wherein the step of obtaining the output voltage of the second magnetic detecting element obtains, by controlling at the step of performing the feedback control the output voltage of the first magnetic detecting element at the constant value ($Vhe1=A \cdot K \cdot Bhe1+Vref=0$), the output voltage ($Vhe2=-Vref \cdot Bhe2/Bhe1$) as a ratio between magnetic flux density (Bhe1) the first magnetic detecting element receives and magnetic flux density (Bhe2) the second magnetic detecting element receives.

In addition, the position detecting method can operate in a condition that an absolute value of the magnetic flux density the first magnetic detecting element and the second magnetic detecting element each detect is a certain value excluding zero.

Besides, the magnetic detecting elements can be Hall elements.

According to the present invention, since it comprises a plurality of magnetic detecting elements placed separately from each other; a magnetic flux generating body that moves relatively to the magnetic detecting elements; and deciding means for making a decision of an original position by using changes in a ratio between output voltages of the magnetic detecting elements, wherein said deciding means comprises: a control section for feedback controlling the output voltage from a first magnetic detecting element of said magnetic detecting elements at a constant value; and a driving section for driving a second magnetic detecting element of said magnetic detecting elements by a same driving current as a driving current supplied to said first magnetic detecting element when said control section controls the output voltage at the constant value, and said deciding means obtains as its output a ratio between the output voltage of said first magnetic detecting element and the output voltage of said second magnetic detecting element, it can realize the position detecting device and position detecting method capable of eliminating variation in temperature characteristics and canceling an error due to looseness in a vertical direction by calculating the ratio between output voltages of the plurality of Hall elements, and capable of miniaturization.

In addition, since the present invention employs a division method (ratio) whose output becomes one (ratio) at the origin, but becomes zero when the magnet is removed, it can make a loaded or unloaded decision of the magnet.

BEST MODE FOR CARRYING OUT THE INVENTION

The best mode for carrying out the invention will now be described with reference to the accompanying drawings. First, to explain the position detecting sensor of the division method used in the position detecting device in accordance with the present invention, it will be described in comparison with the position detecting sensor of the conventional subtraction method.

Figure 1:
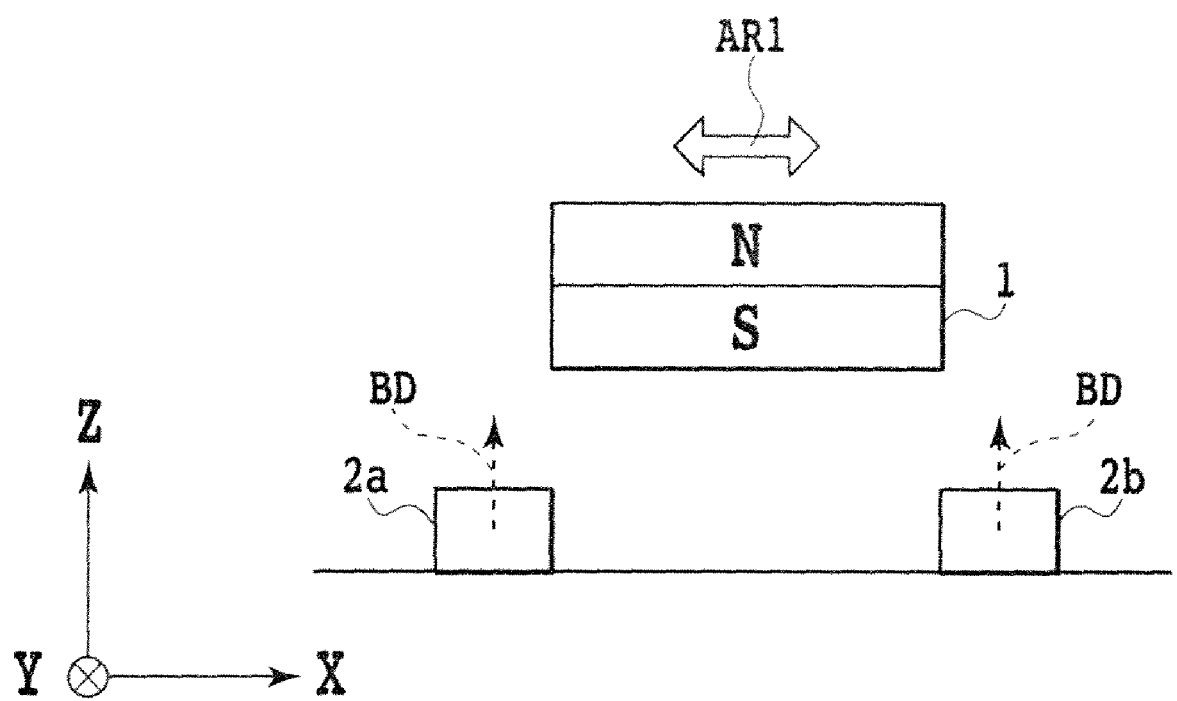
FIG. 1 is a block diagram for explaining a conventional position detecting device based on a magnetic sensor, and is a diagram showing a position detecting sensor comprising a magnet and Hall elements.
Figure 2:
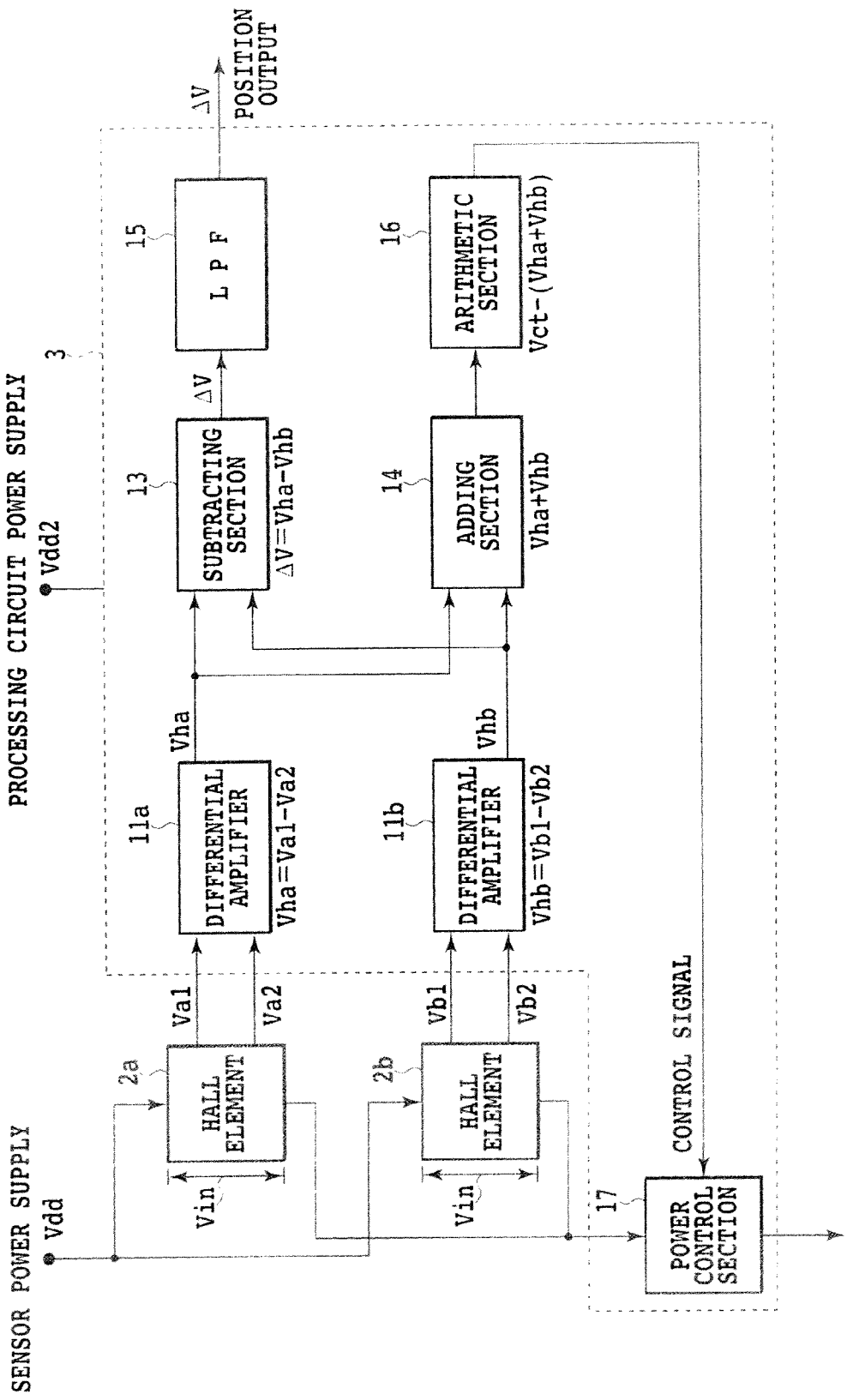
FIG. 2 is a block diagram for explaining the conventional position detecting device based on the magnetic sensor, and is a diagram showing the signal processing circuit of the position detecting device incorporating the position detecting sensor shown in FIG. 1.
Figure 3A:
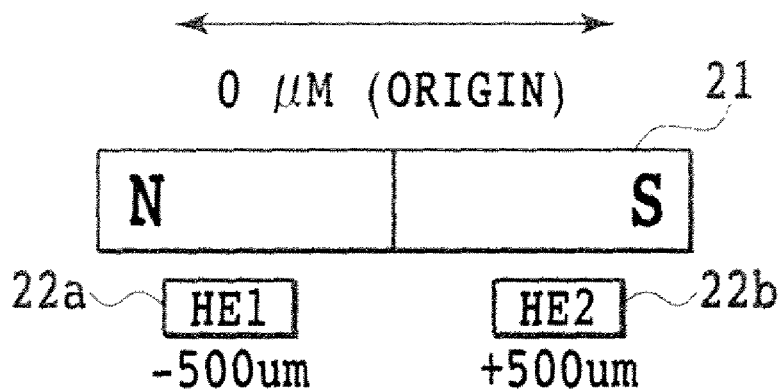
FIG. 3A is a diagram showing a configuration of an embodiment of the position detecting sensor in accordance with the present invention, and is a diagram for explaining a conventional difference (sum) method.
Figure 3B:
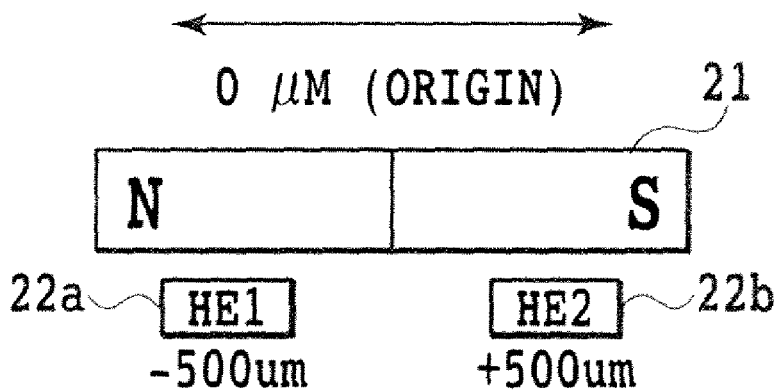
FIG. 3B is a diagram showing a configuration of an embodiment of the position detecting sensor in accordance with the present invention, and is a diagram for explaining a division method of the present invention.

FIG. 3A and FIG. 3B are diagrams for comparing the position detecting sensor based on the division method in accordance with the present invention with the position detecting sensor based on the conventional subtraction method. FIG. 3A is a diagram for explaining the subtraction method, and FIG. 3B is a diagram for explaining the division method. In these figures, the reference numeral 21 designates a magnet, and 22a and 22b designate Hall elements HE1 and HE2, respectively.

Each position detecting sensor has one magnet 21 and two Hall elements 22a and 22b which are placed separately from each other. In the example, the Hall elements 22a and 22b each have their center at a position ±500 μm apart from the origin (0 μm). The magnet 21 has a disk-like shape, and has its side portions magnetized with the N-pole and the S-pole. The Hall elements 22a and 22b are fixed to a fixing side body (fixing component) such as a device body, whereas the magnet 21 is fixed to a moving side body (moving component) that moves with respect to the fixing component. Then, the magnet 21 fixed to the moving component is movable in the direction of the arrows (X directions) in these figures with respect to the Hall elements 22a and 22b fixed to the fixing component.

In the subtraction method shown in FIG. 3A, the output at the origin is zero. In contrast with this, in the division method shown in FIG. 3B, the absolute value of the output at the origin becomes one (ratio), that is, a nonzero value.

Figure 4:
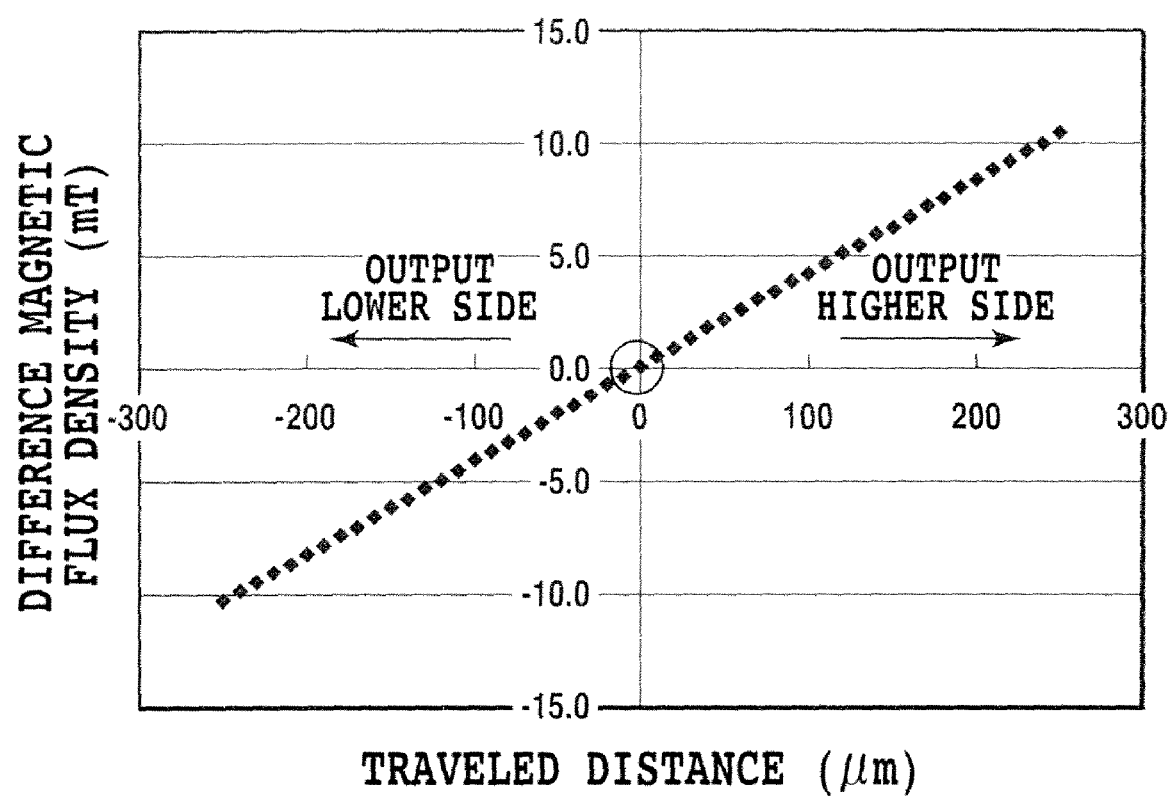
FIG. 4 is a diagram showing relationships between a traveled distance (μm) of a magnet versus difference magnetic flux density (mT) owing to Hall elements in the subtraction method.

FIG. 4 is a diagram showing relationships between the traveled distance (μm) of the magnet versus difference magnetic flux density (mT) owing to the Hall elements in the subtraction method. Near the origin, the magnetic field becomes zero in terms of the sum. As the magnet moves from the origin, the magnitude of the magnetic field in terms of the sum increases linearly from left to right.

Figure 5A:
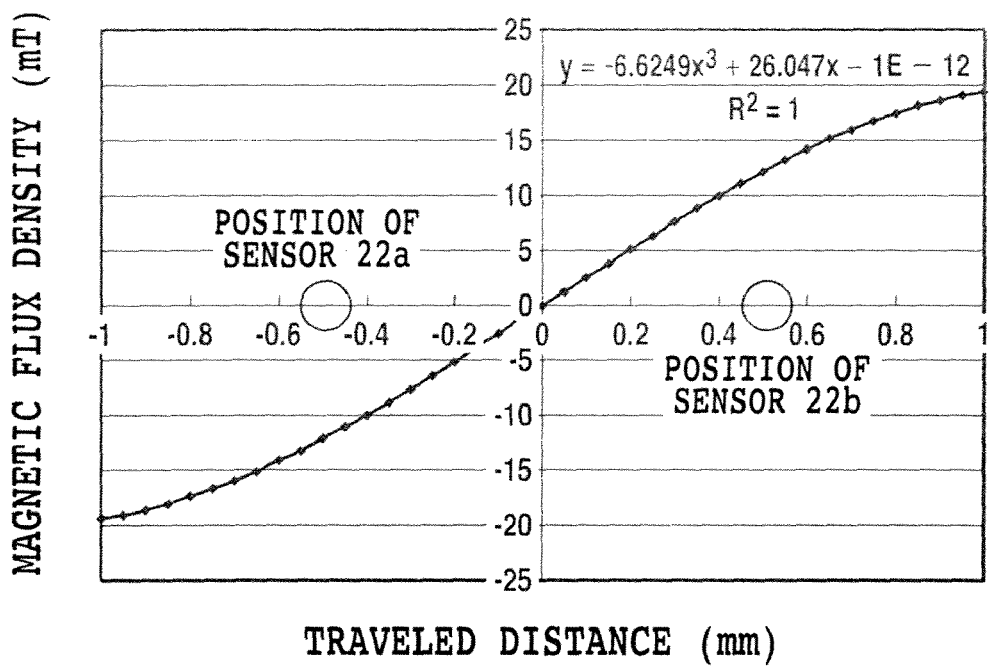
FIG. 5A is a diagram for explaining the division method in the present invention, and shows relationships of the magnetic flux density (mT) against the traveled distance (mm)
Figure 5B:
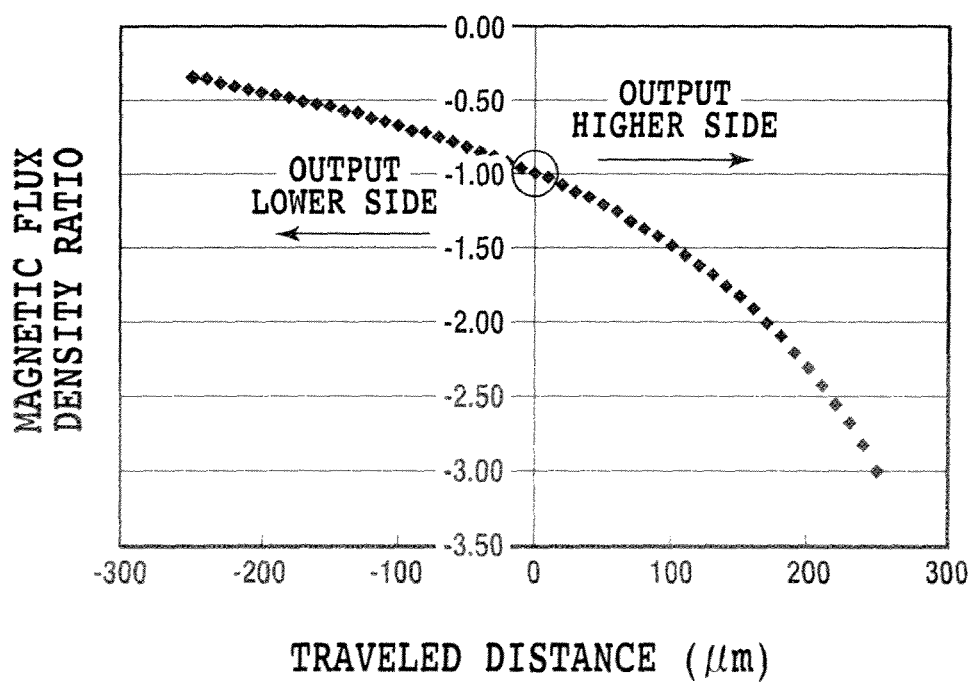
FIG. 5B is a diagram for explaining the division method in the present invention, and shows relationships of a magnetic flux density ratio against the traveled distance (μm)

FIG. 5A and FIG. 5B are diagrams for explaining the division method in the present invention: FIG. 5A shows relationships of the magnetic flux density (mT) against the traveled distance (mm); and FIG. 5B shows relationships of a magnetic flux density ratio against the traveled distance (μm).

Considering the relationships between the traveled distance (mm) and the magnetic flux density (mT) in FIG. 5A, that is, such relationships as the magnetic flux density increases with an increase of the traveled distance, it is possible to obtain the changes in the ratio because it declines from left to right in accordance with the movement from minus to plus side as shown in FIG. 5B, thereby being able to detect the ON-OFF. Ideally, the origin is detected by finding as to whether the absolute value of the ratio is greater or less than one according to the ON-OFF.

Figure 6A:
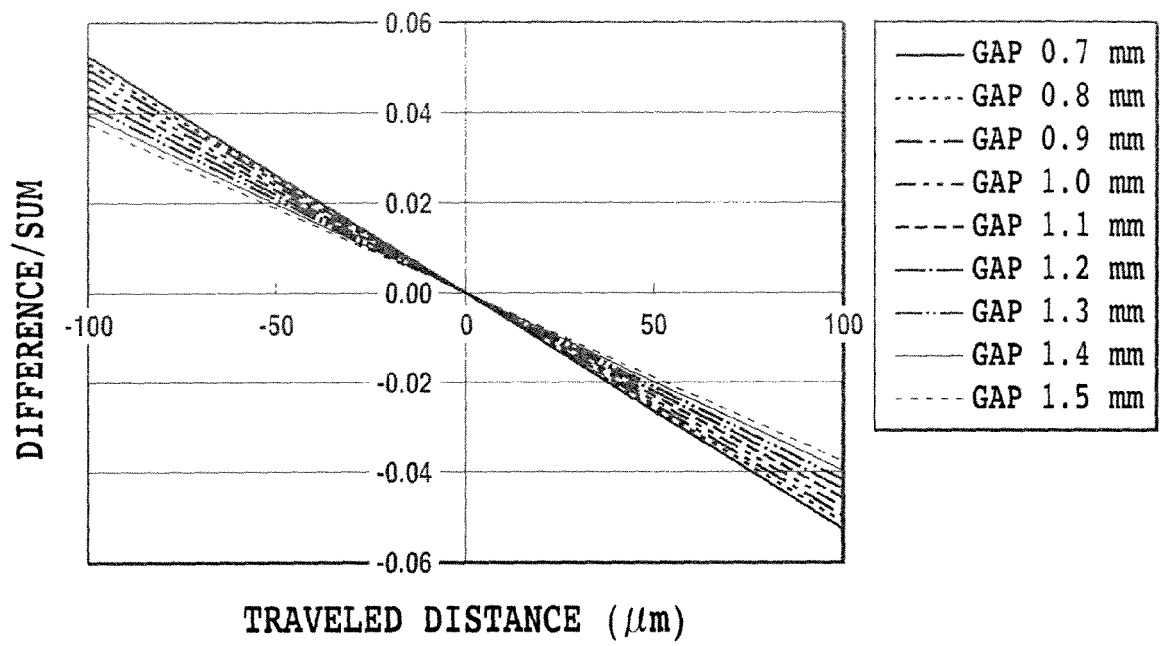
FIG. 6A is a diagram showing the GAP dependence of a signal (difference/sum) in the subtraction method.
Figure 6B:
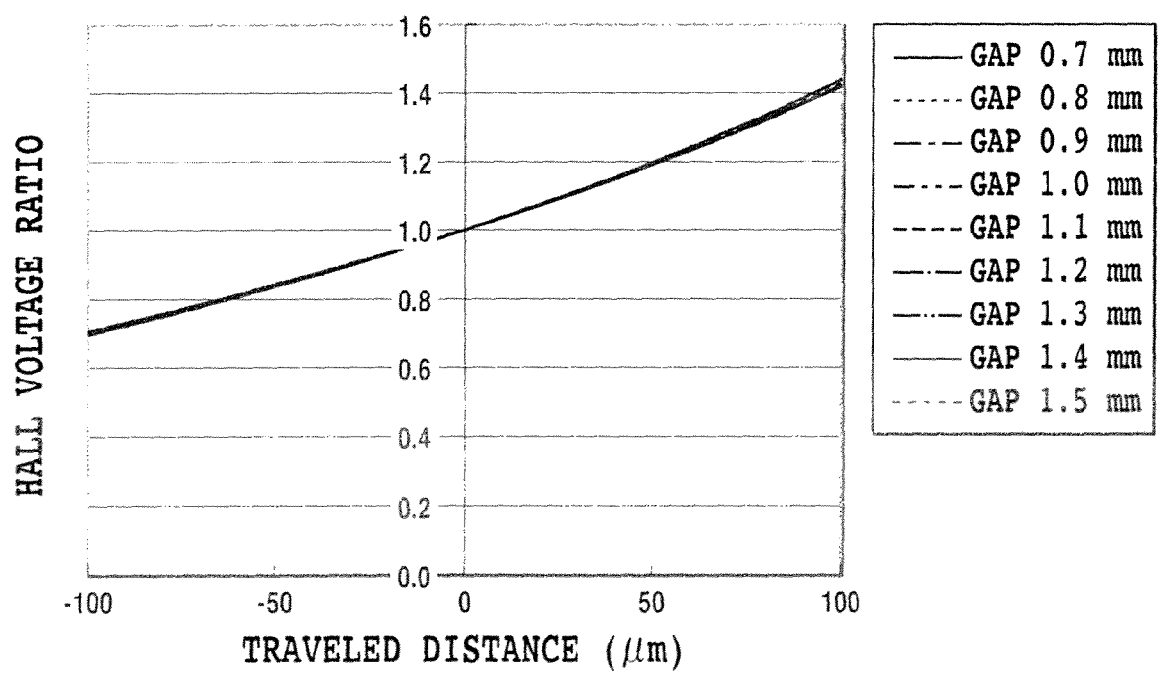
FIG. 6B is a diagram showing the GAP dependence of a signal (absolute value of the ratio) in the division method.

FIG. 6A and FIG. 6B are diagrams showing the GAP dependence of the output signals in the position detecting sensors of the conventional difference (sum) method and of the division method in accordance with the present invention: FIG. 6A is a diagram showing the GAP dependence of the signal (difference/sum) in the difference (sum) method; and FIG. 6B is a diagram showing the GAP dependence of the signal (absolute value of the ratio) in the division method.

FIG. 6A and FIG. 6B show relationships between the traveled distance (μm) and the output signals in the case where the distance between the centers of magneto-sensitive sections of the Hall elements 22a and 22b is 1 mm and where the GAP is varied from 0.7 mm to 1.5 mm. In FIG. 6A, the difference/sum output of the Hall voltage in the range of ±100 μm from the origin (0 μm) has linear characteristics of declining from left to right as the movement from the minus to plus side. In contrast, in FIG. 6B, the output of the Hall voltage ratio in the range of ±100 μm from the origin (0 μm) has characteristics of increasing from left to right as the movement from the minus to plus side.

As is clear from FIG. 6A and FIG. 6B, in the conventional difference (sum) method, the output signal varies depending on the GAP, whereas in the division method, it is nearly independent of the GAP. In other words, the division method has an advantage that the output hardly fluctuates for the looseness in the vertical direction.

Figure 7:
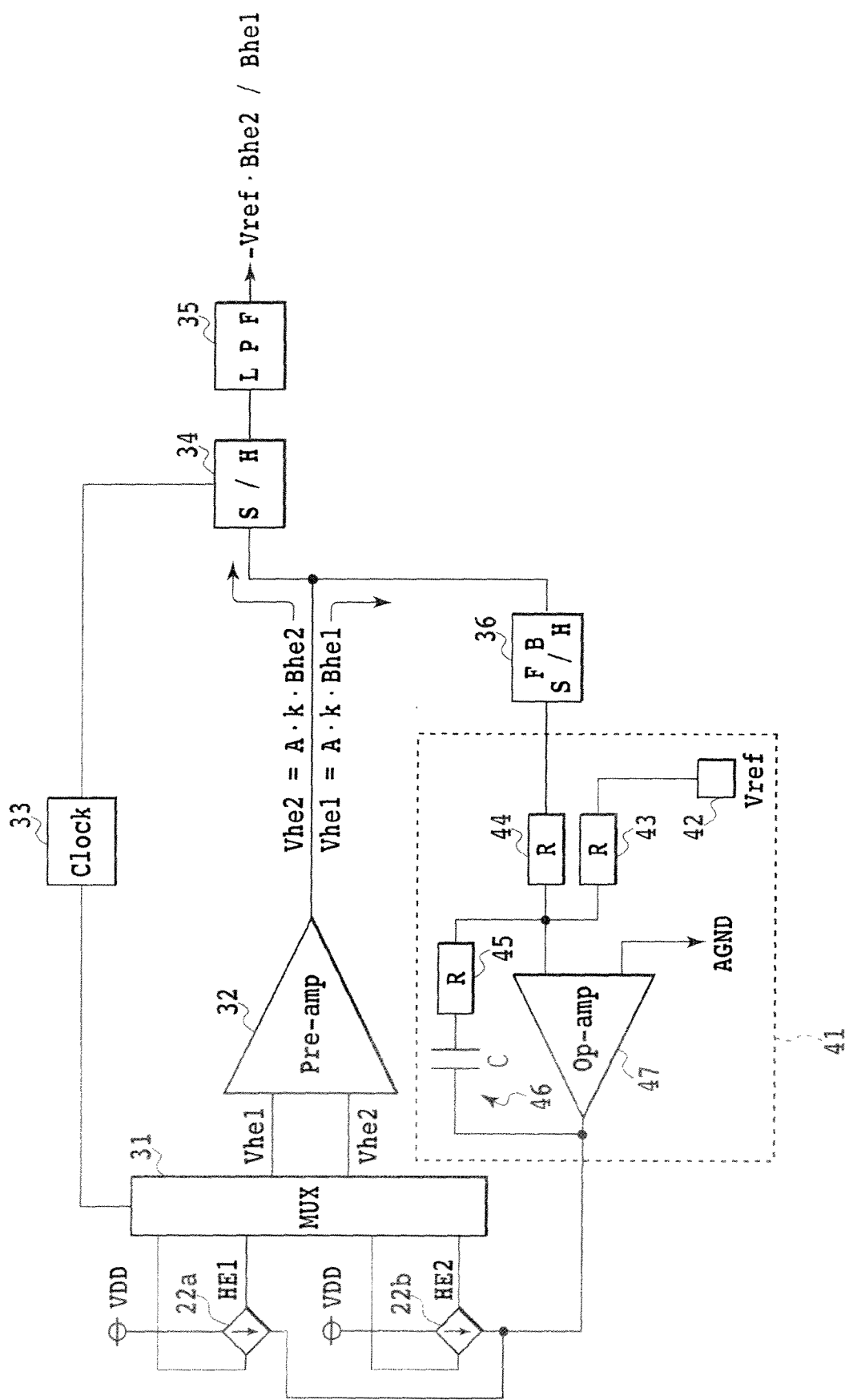
FIG. 7 is a block diagram for explaining an embodiment of the position detecting device in accordance with the present invention, and is a diagram showing the signal processing circuit of the position detecting device when using the position detecting sensor in accordance with the division method shown in FIG. 3B.

FIG. 7 is a block diagram for explaining an embodiment of the position detecting device in accordance with the present invention, and is a diagram showing the signal processing circuit of the position detecting device when using the position detecting sensor in accordance with the division method shown in FIG. 3B. In FIG. 7, the reference numeral 31 designates a multiplexer (MUX: selecting circuit), 32 designates a preamplifier (operational amplifier), 33 designates a clock signal generating circuit (Clock), 34 designates a sample and hold circuit (S/H), 35 designates a low-pass filter (LPF), 36 designates a feedback sample and hold circuit (FB S/H), 41 designates a PI (proportional-integral) regulator, 42 designates a reference voltage generating circuit, 43-45 each designate a resistance, 46 designates a capacitor, and 47 designates an operational amplifier.

The MUX 31 is a selecting circuit with a function of selecting the signal component of the Hall element 22a (HE1) or the signal component of the Hall element 22b (HE2). The preamplifier 32 is an operational amplifier for amplifying the output voltages of the Hall elements 22a and 22b. The sample and hold circuit 34 is a circuit for sampling the signal from the preamplifier 32 in accordance with the clock signal the clock signal generating circuit 33 generates in response to the signal from the MUX 31. The low-pass filter 35, which is connected to the sample and hold circuit 34, outputs the position detection signal $-Vref \cdot B2/B1$. The feedback sample and hold circuit 36 is a circuit for inputting the signal from the preamplifier 32 to the PI regulator 41.

The PI regulator 41 comprises the reference voltage generating circuit 42, the resistances 43 to 45, the capacitor 46 and the operational amplifier 47. The operational amplifier 47 has its inverting input terminal connected to the feedback sample and hold circuit 36 via the resistance 44 and to the reference voltage generating circuit 42 via the resistance 43. In addition, the operational amplifier 47 has its non-inverting input terminal grounded. Furthermore, the operational amplifier 47 has the resistance 45 and capacitor 46 connected in series across its inverting input terminal and output terminal.

The PI regulator 41 is a regulator for carrying out the PI control in such a manner that the signal sampled by the feedback sample and hold circuit 36 is adjusted to the voltage level of the reference voltage Vref. The PI regulator 41 performs the PI control according to the time constant determined by the resistance 45 and the capacitor 46 so that it can control the signal sampled discretely without oscillation. The clock signal generating circuit 33 is a circuit for generating the clock signal that determines the signal to be put into the sample and hold circuit 34 and the feedback sample and hold circuit 36. Besides, the PI regulator 41 supplies the Hall elements 22a and 22b with a driving current.

Next, the operation of the signal processing circuit will be described.

The Hall voltage Vhe1 (Vhe2) output from the Hall element 22a (or 22b) is connected to the preamplifier 32 via the MUX 31 when the Hall element 22a (22b) is selected by the clock signal generated by the clock signal generating circuit 33, and is amplified at a prescribed amplification factor A.

Assume that the Hall voltage Vhe1 of the Hall element 22a is amplified by the preamplifier 32 and is put into the PI regulator 41 via the feedback sample and hold circuit 36, and that the Hall voltage Vhe2 of the Hall element 22b is output via the sample and hold circuit 34 and low-pass filter 35. When the Hall voltage Vhe1 of the Hall element 22a is amplified by the preamplifier 32 and becomes A·K·Bhe1 (where A is the amplification factor of the preamplifier 32, K is a constant, and Bhe1 is the magnetic flux density the Hall element 22a receives), the PI regulator 41 automatically varies the bias point of the PI output by the feedback control in such a manner as to satisfy the following expression.

$$A \cdot K \cdot Bhe1 + Vref = AGND(=0) \quad (1)$$

Now, consider the case of driving the Hall element 22b at the same bias point as that of the PI output. Assume that it is driven at the same bias point, and the Hall elements 22a and 22b have good matching in the magnetic sensitivity. Then, the Hall voltage Vhe2 of the Hall element 22b which passes through the amplification and is put into the sample and hold circuit 34 becomes A·K·Bhe2.

Since the constant K obtained from the foregoing expression (1) is R=−Vref/A·Bhe1, the Hall voltage Vhe2 of the Hall element 22b is given by the following expression.

$$-Vref \cdot Bhe2/Bhe1 \quad (2)$$

The operation is performed by only the feedback control of the PI regulator 41, which means that the Hall voltage Vhe2 of the Hall element 22b output from the low-pass filter 35 is produced in the form of the ratio between the magnetic flux density of the Hall element 22a and that of the Hall element 22b without requiring any arithmetic means.

Thus, it is found that the output voltage, which is obtained by driving the Hall element 22b at the same voltage as the Hall element 22a while controlling the Hall voltage Vhe1 of the Hall element 22a at the constant voltage, has the form of dividing the magnetic flux density received by the Hall element 22b by that received by the Hall element 22a. Since the Hall voltage is proportional to the magnetic flux density, it is found that the foregoing expression (2) is equivalent to the division of the output voltage of the Hall element 22b by the output voltage of the Hall element 22a. Incidentally, the position detecting device in accordance with the present invention operates under the condition that the absolute value of the magnetic flux density detected by the Hall element 22a and Hall element 22b is a certain value excluding zero.

In this way, if the temperature coefficient of the magnetic field is the same for Bhe1 and Bhe2, the output voltage Vhe2 of the Hall element 22b is constant for temperature. In addition, if the attenuation of the magnetic field is the same for Bhe1 and Bhe2, it does not have any effect on the output voltage Vhe2 of the Hall element 22b.

Figure 8:
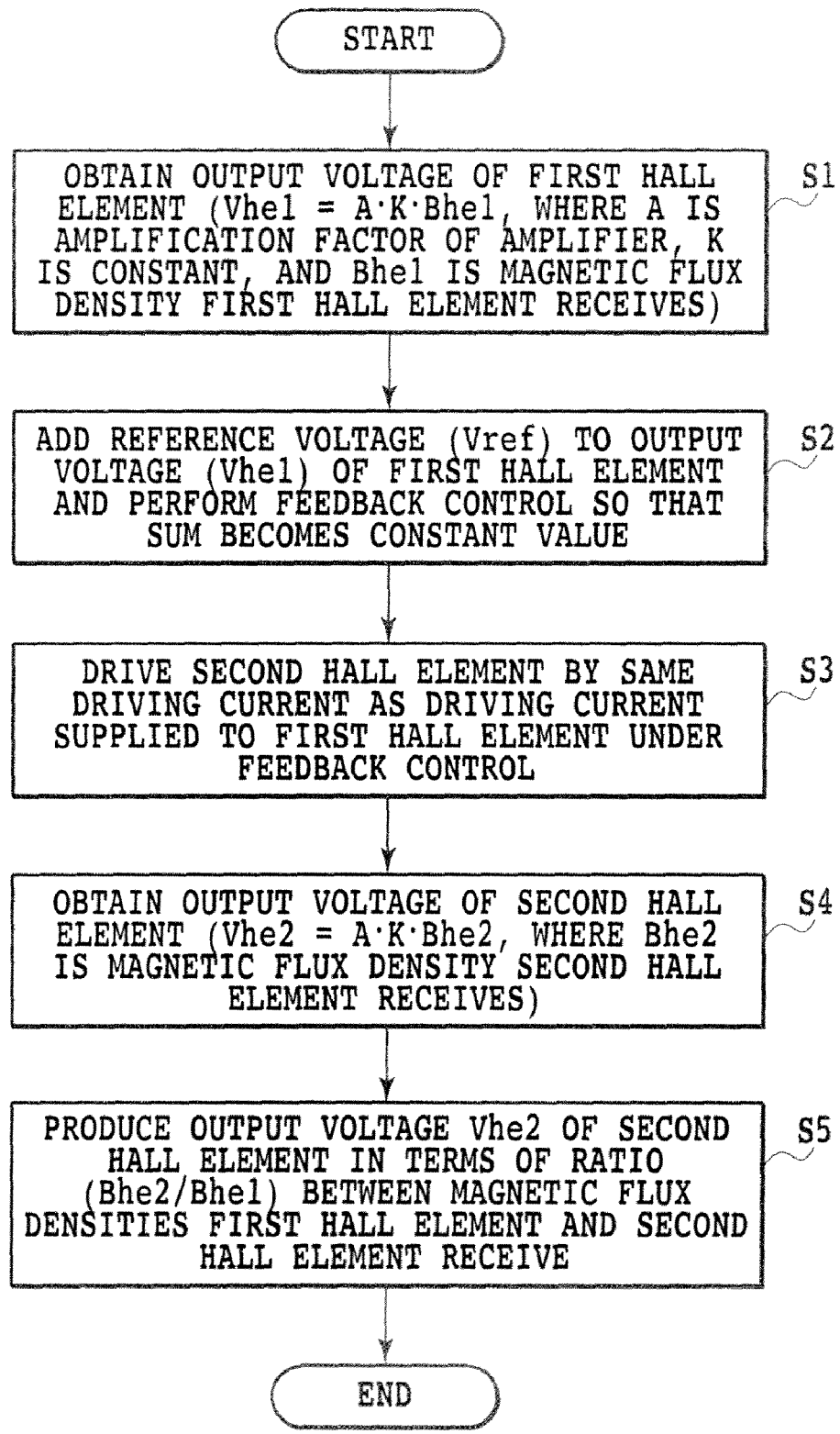
FIG. 8 is a flowchart for explaining an embodiment of the position detecting method in accordance with the present invention.

FIG. 8 is a diagram showing a flowchart for explaining an embodiment of the position detecting method in accordance with the present invention.

First, the output voltage of the Hall element 22a (Vhe1=A·K·Bhe1 where A is the amplification factor of the amplifier, K is a constant, and Bhe1 is the magnetic flux density the Hall element 22a receives) is obtained via the selecting circuit 31 and preamplifier 32 (step 1).

Next, the amplified output voltage of the Hall element 22a is input to the PI regulator 41 via the feedback sample and hold circuit 36, and the PI regulator 41 adds the reference voltage (Vref) to the output voltage (Vhe1) of the Hall element 22a and carries out the feedback control in such a manner that its output becomes the constant value (step 2).

Next, the Hall element 22b is driven by the same driving current as the driving current supplied to the Hall element 22a under the feedback control (step 3).

Next, the output voltage of the Hall element 22b (Vhe2=A·K·Bhe2, where Bhe2 is the magnetic flux density the Hall element 22b receives) via the selecting circuit 31 and preamplifier 32 (step 4).

Next, via the sample and hold circuit 34 and low-pass filter 35, the amplified output voltage Vhe2 of the Hall element 22b is output in the form of the ratio (Bhe2/Bhe1) between the magnetic flux densities the Hall element 22a and Hall element 22b receive (step 5).

Controlling the output voltage of the Hall element 22a at the constant value (Vhe1=A·K·Bhe1+Vref=0) at step 2 that performs the foregoing feedback control makes it possible, at step 5 that outputs the output voltage of the Hall element 22b, to obtain the output voltage (Vhe2=−Vref·Bhe2/Bhe1) which is the ratio between the magnetic flux density (Bhe1) the Hall element 22a receives and the magnetic flux density (Bhe2) the Hall element 22b receives.

In this way, it is found that since the Hall voltage is proportional to the magnetic flux density, it is equivalent to carrying out the division between the output voltages of the Hall element 22a and the Hall element 22b.

Next, a loaded or unloaded decision of the magnet, which is impossible conventionally, but becomes possible by using the division method in accordance with the present invention, will be described. As described above, in the difference (sum) method shown in FIG. 3A, the absolute value of the output at the origin is zero, and the output at the time when the magnet 21 is removed is also zero. Accordingly, the loaded or unloaded decision of the magnet cannot be made in this case. In contrast with this, in the division method shown in FIG. 3B, the absolute value of the output at the origin becomes one (ratio), that is, a nonzero value, and the output at the time when the magnet 21 is removed is zero. Accordingly, the loaded or unloaded decision of the magnet becomes possible in this case.

Although in the foregoing description, the constant K is obtained from the output voltage of the first Hall element 22a, and the output of the magnetic flux density ratio Bhe2/Bhe1 is obtained from the relationships between the output voltage of the second Hall element 22b and the constant K, it is obvious that the reverse is also possible: the constant K can be obtained from the output voltage of the second Hall element 22b; and the output of the magnetic flux density ratio Bhe1/Bhe2 can be obtained from the relationships between the output voltage of the first Hall element 22a and the constant K. In addition, although the foregoing embodiment is described by way of example having two Hall elements, it is obvious that it can be applied to the position detection having two or more Hall elements.

INDUSTRIAL APPLICABILITY

The present invention, which relates to a position detecting device and a position detecting method for detecting the origin of the autofocus or zoom position of a camera, can implement the position detecting device and the position detecting method that enable the cancellation of variation in the temperature characteristics and the elimination of an error owing to the looseness in the vertical direction by calculating the ratio between the output voltages of a plurality of Hall elements, and that enable miniaturization. In addition, the present invention employs the division method (ratio) so that the output at the origin becomes one (ratio) and the output at the time when the magnet is removed is zero, thereby being able to make the loaded or unloaded decision of the magnet.

What is claimed is:

1. A position detecting device comprising:
   a plurality of magnetic detecting elements placed separately from each other;
   a magnetic flux generating body that moves relatively to said magnetic detecting elements; and
   deciding means for making a decision of an original position by using changes in a ratio between output voltages of said magnetic detecting elements, wherein said deciding means comprises:
   a control section for feedback controlling the output voltage from a first magnetic detecting element of said magnetic detecting elements at a constant value; and
   a driving section for driving a second magnetic detecting element of said magnetic detecting elements by a same driving current as a driving current supplied to said first magnetic detecting element when said control section controls the output voltage at the constant value, and
   said deciding means obtains as its output a ratio between the output voltage of said first magnetic detecting element and the output voltage of said second magnetic detecting element.

2. The position detecting device as claimed in claim 1, operating in a condition that an absolute value of magnetic flux density said first magnetic detecting element and said second magnetic detecting element each detect is a certain value excluding zero.

3. The position detecting device as claimed in claim 2, wherein said control section comprises:
   a function of adding a reference voltage to the output voltage of said first magnetic detecting element; and
   a function of adjusting the output voltage of said first magnetic detecting element at the constant value.

4. The position detecting device as claimed in claim 2, further comprising:
   a feedback sample and hold circuit placed at a stage previous to said control section, for sampling the output signal of said first magnetic detecting element; and
   a sample and hold circuit placed at an output stage, for sampling the output signal of said second magnetic detecting element.

5. The position detecting device as claimed in claim 2, placing said magnetic flux generating body and said magnetic detecting elements in a manner that the outputs of said magnetic detecting element become nonzero when said magnetic flux generating body is loaded, but become zero when said magnetic flux generating body is removed; and making a decision of a loaded or unloaded state of said magnetic flux generating body according to an output of the ratio between the output voltages of said magnetic detecting elements.

6. The position detecting device as claimed in claim 1, wherein said magnetic detecting elements are Hall elements.

7. The position detecting device as claimed in claim 1, wherein said control section comprises:
   a function of adding a reference voltage to the output voltage of said first magnetic detecting element; and
   a function of adjusting the output voltage of said first magnetic detecting element at the constant value.

8. The position detecting device as claimed in claim 7, further comprising:
   a feedback sample and hold circuit placed at a stage previous to said control section, for sampling the output signal of said first magnetic detecting element; and
   a sample and hold circuit placed at an output stage, for sampling the output signal of said second magnetic detecting element.

9. The position detecting device as claimed in claim 7, placing said magnetic flux generating body and said magnetic detecting elements in a manner that the outputs of said magnetic detecting element become nonzero when said magnetic flux generating body is loaded, but become zero when said magnetic flux generating body is removed; and making a decision of a loaded or unloaded state of said magnetic flux generating body according to an output of the ratio between the output voltages of said magnetic detecting elements.

10. The position detecting device as claimed in claim 1 further comprising: a feedback sample and hold circuit placed at a stage previous to said control section, for sampling the output signal of said first magnetic detecting element; and
   a sample and hold circuit placed at an output stage, for sampling the output signal of said second magnetic detecting element.

11. The position detecting device as claimed in claim 1, placing said magnetic flux generating body and said magnetic detecting elements in a manner that the outputs of said magnetic detecting element become nonzero when said magnetic flux generating body is loaded, but become zero when said magnetic flux generating body is removed; and making a decision of a loaded or unloaded state of said magnetic flux generating body according to an output of the ratio between the output voltages of said magnetic detecting elements.

12. A position detecting method in a position detecting device having a plurality of magnetic detecting elements placed separately from each other, and a magnetic flux generating body that moves relatively to said magnetic detecting elements, said position detecting method comprising:
   a step of obtaining an output voltage of a first magnetic detecting element of said magnetic detecting elements;
   a step of performing feedback control in a manner that a sum of a reference voltage and the output voltage of said first magnetic detecting element becomes a constant value;
   a step of driving a second magnetic detecting element of said magnetic detecting elements by a same driving current as a driving current supplied to said first magnetic detecting element at a time when the feedback control is performed; and a step of obtaining an output voltage of said second magnetic detecting element, wherein the step of obtaining the output voltage of said second magnetic detecting element obtains, by controlling at the step of performing the feedback control the output voltage of said first magnetic detecting element at the constant value, the output voltage as a ratio between magnetic flux density said first magnetic detecting element applied and magnetic flux density said second magnetic detecting element applied.

13. The position detecting method as claimed in claim 12, operating in a condition that an absolute value of the magnetic flux density said first magnetic detecting element and said second magnetic detecting element each detect is a certain value excluding zero.

14. The position detecting method as claimed in claim 13, wherein said magnetic detecting elements are Hall elements.

15. The position detecting method as claimed in claim 12, wherein said magnetic detecting elements are Hall elements.

* * * * *